MACHINE READY TO DELIVER PAPER
BRIDGE IN POSITION, GATE FORWARD

DELIVERY COMPLETE READY TO CUT
BRIDGE WITHDRAWN, GATE FORWARD

CUTTING COMPLETE BRIDGE WITHDRAWN
GATE WITHDRAWN POLICY ACCESSIBLE

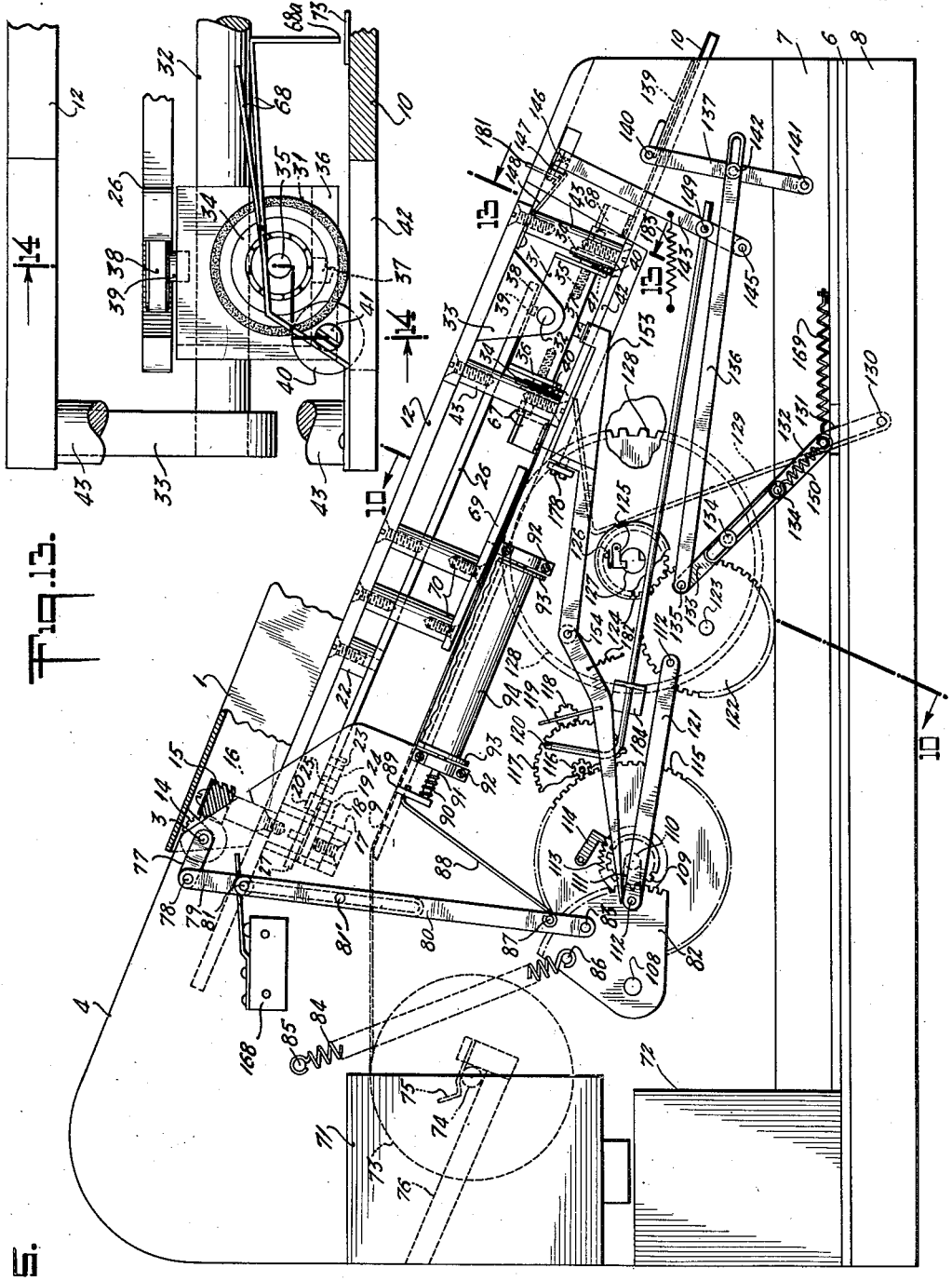

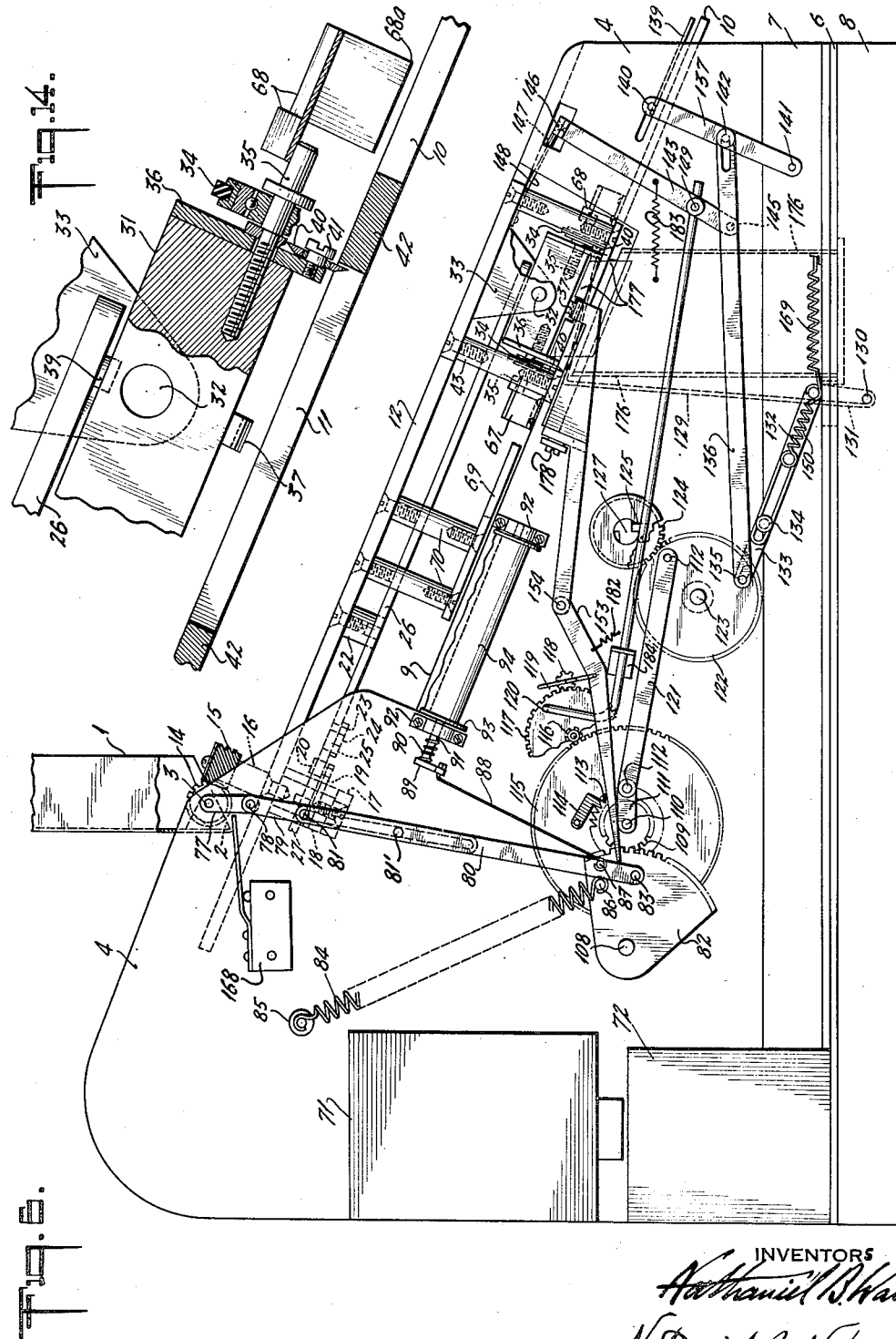

Nov. 20, 1951         N. B. WALES ET AL         2,575,606
                        VENDING MACHINE
Filed Nov. 26, 1947                          8 Sheets-Sheet 4
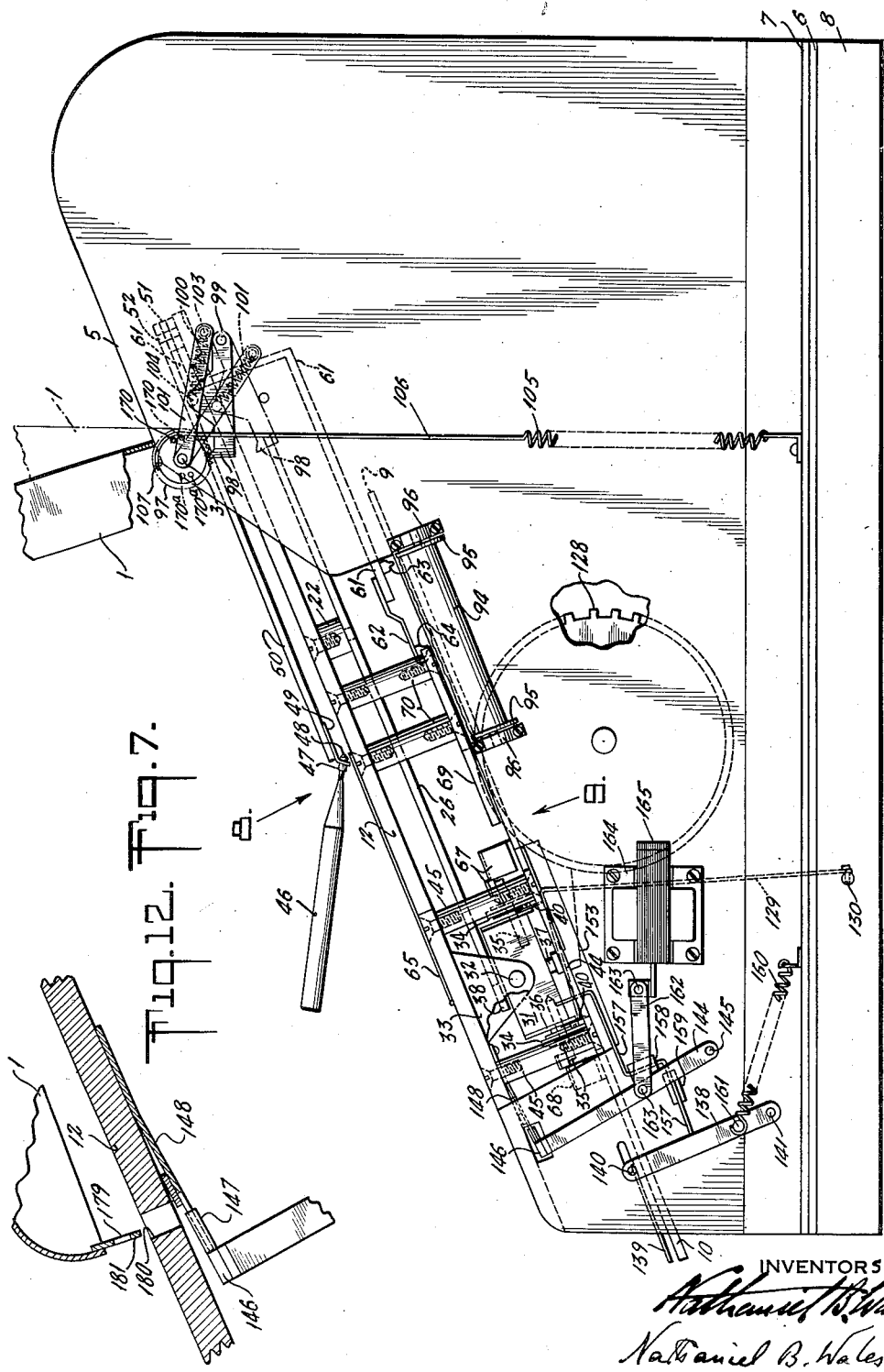
INVENTORS
Nathaniel B. Wales
Nathaniel B. Wales Jr.

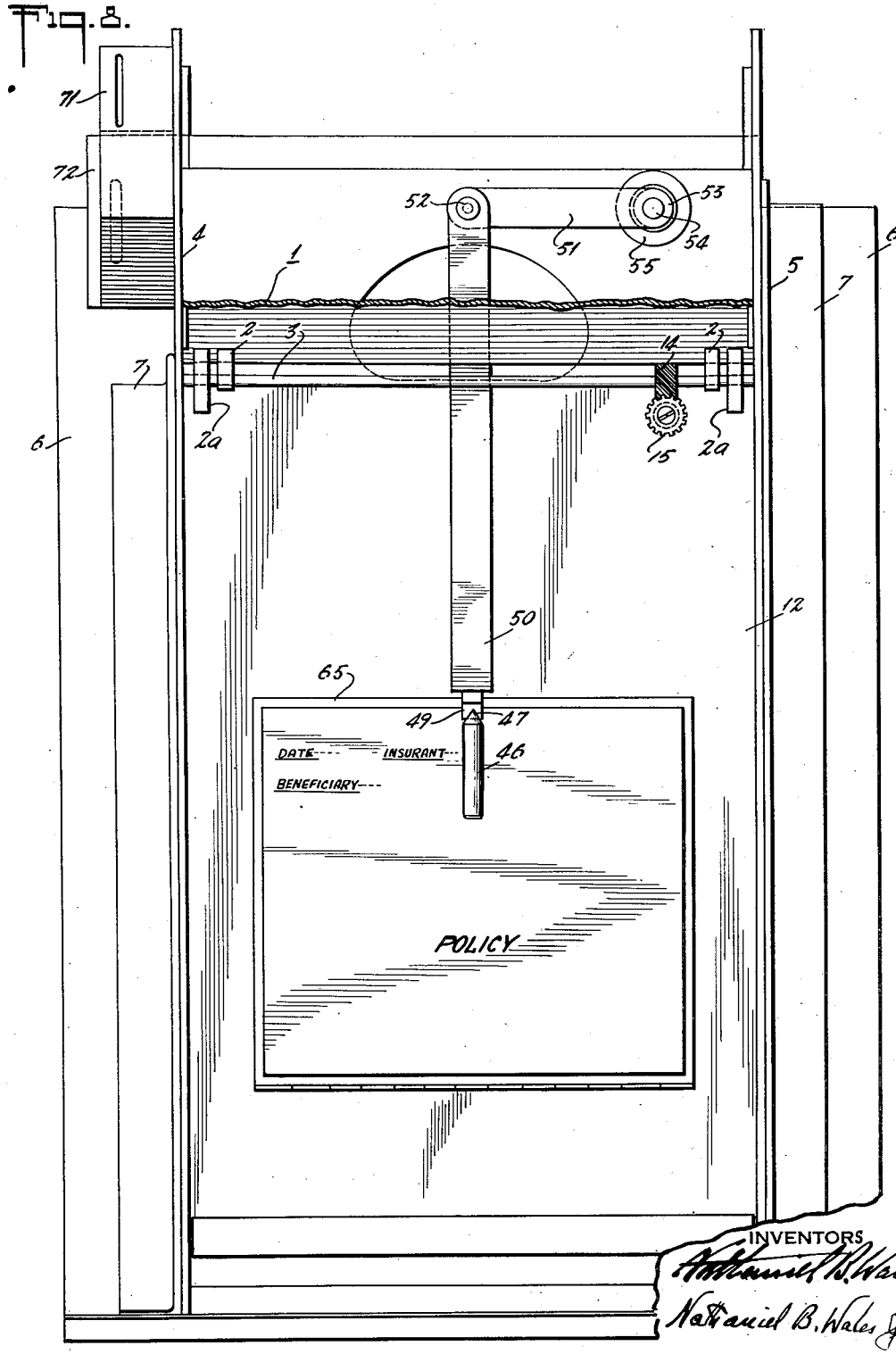

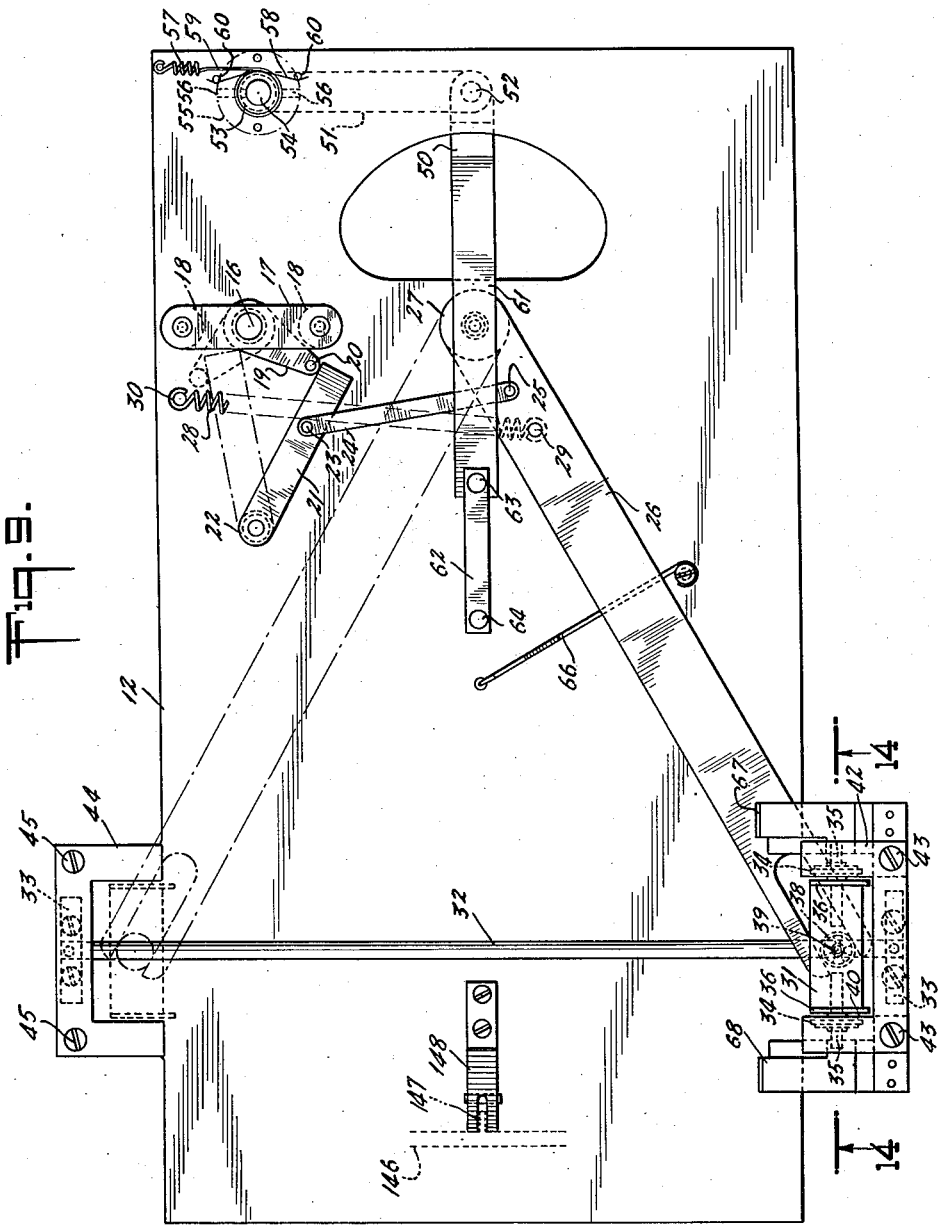

Nov. 20, 1951 N. B. WALES ET AL 2,575,606
VENDING MACHINE
Filed Nov. 26, 1947 8 Sheets-Sheet 7

Nov. 20, 1951  N. B. WALES ET AL  2,575,606
VENDING MACHINE
Filed Nov. 26, 1947  8 Sheets-Sheet 8

INVENTORS
Nathaniel B. Wales
Nathaniel B. Wales Jr

Patented Nov. 20, 1951

2,575,606

UNITED STATES PATENT OFFICE 2,575,606

VENDING MACHINE

Nathaniel B. Wales, New York, N. Y., and Nathaniel B. Wales, Jr., Morristown, N. J., assignors to Industrial Patent Corporation, New York, N. Y.

Application November 26, 1947, Serial No. 790,034

12 Claims. (Cl. 33—23)

This invention relates to vending machines, and more particularly to a contract vending device for selling and dispensing insurance policies.

One of the objects of this invention is to safeguard the actual policy form so that it cannot be mutilated or tampered with, or handled by the purchaser until all necessary data, such as the insurant's signature, beneficiary, date, or such other insertions as are necessary, have been reproduced on the actual policy and receipt by the machine. To accomplish this we utilize a lever system which produces two copies of the above mentioned data as written on an accessible dummy policy by the customer. This lever system reproduces this data on both the receipt and the actual policy while they are still integral with and part of the unitary roll on which they are printed seriatim. In this manner only one roll is required to supply both the receipt, which after being severed from the roll is retained within the machine, and the policy, which after being severed is issued to the purchaser.

Another object is to achieve a compact low-cost paper cutter which simultaneously severs the receipt and the policy from the unitary roll on which they are printed. Also to attain a durable cutter which severs the paper roll coincidently at appropriate points for the receipt and policy, and one in which the cutting edge is automatically advanced, or shifted, as to the point at which the paper contacts the cutter. This is accomplished by utilizing a circular knife edge which contacts the paper to be cut along a chord of said cutter. The circular knife is rotatably mounted on a bearing and hence is rotated to a varying degree thereon during each cutting operation by the turning moment developed by its contact with the paper. In this manner a different segment of the circular cutter is presented to the edge of the paper at each cutting, and its effective life is greatly increased as compared to a fixed cutting edge which quickly dulls by constant service.

A further object is to attain lightness and maximum compactness in such a machine by eliminating electric motors and their reduction transmissions to operate the various functional mechanisms. This is accomplished by utilizing the hinged cover of the machine, which must be raised by the customer to have access to the stylus and which by its manual displacement supplies the power necessary to automatically cycle the vending machine.

Another object is to utilize the displacement of the lid, or cover of the machine to wind a governor-controlled spring motor to advance the paper in the machine, rather than operate the paper advancing mechanism directly by the closing of the cover, as the operator might close the cover so fast that the paper would be torn by its rapid acceleration, whereas by employing a spring motor which is wound by the opening of the cover, a known value of acceleration, which has been predetermined, is used to move the paper into operative position. This governor controlled acceleration of the paper permits the use of a cheap paper in the machine by providing harmonic acceleration and de-acceleration of the machine's engagement with the paper by the spring motor.

Another object is to provide means which compel the customer to raise the cover of the machine through a normal displacement thereof, so that the machine will function properly.

A further object is to provide automatic locking means for the cover so that the cover cannot be raised until the proper coin, or coins, is inserted into the coin slot in the machine.

Another object is to provide on the dummy policy, which is exposed on lifting the cover of the machine, automatic means to erase, after the cover is closed the insurant's signature, and the other essential data to be written thereon, so that the appropriate blank spaces to be filled in are again ready when the next customer lifts the cover.

Another object which insures security of the machine's operation is that the access gate through which the policy is delivered is operated by the same mechanism which actuates the lid or cover lock and functions simultaneously as the customer closes the cover into its locked position.

A further object is to provide a rolling, clamping action on the paper while it is undergoing cutting, so that a tension is imposed on the paper along a line at right angles to the direction of the cutting. This cross-tension on the paper insures a clean cut by the free rotating circular knife.

Further objects and pertinent details will be more specifically described in the following specifications and drawings in which:

Figure 5 is a left-hand view of the machine in respect to Figure 1 with the housing removed and certain parts including the stylus and writing pad omitted or broken away and showing the lid in a closed position.

Figure 6 is a view similar to Figure 5 with lid fully open and the working components in a cocked position after being operated by the raising of the lid.

Figure 7 is a right-hand side view in respect to Figure 1, similar to Figure 6.

Figure 8 is a view taken in the direction of arrow 8 in Figure 7 with lid parts broken away.

Figure 9 is a view of the hinged chassis plate looking upwards from the bottom of the machine in the direction of the arrow 9 in Figure 7.

Figure 10 is a sectional view taken on lines 10—10 of Figure 5 showing, in particular, the cross-feed of the carbon paper.

Figure 12 is a fragmentary view of the lid-locking mechanism.

Figure 13 is an enlarged fragmentary view taken on line 13—13 of Figure 5 showing the coordination of rotary cutter and rotary and stationary paper tension members.

Figure 14 is an enlarged fragmentary view taken on the line 14—14 of Figures 9 and 13 showing rotary cutter and rotary and stationary paper tension and gripping members.

Figure 15 is an electric circuit diagram of the machine.

Referring more specifically to the drawings in which similar numerals refer to similar parts:

Figure 1:
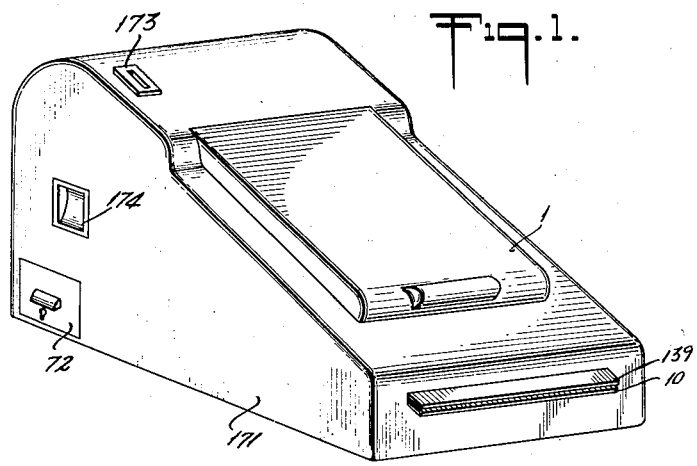
Figure 1 is a perspective view of the device with the lid in closed position.

In Figure 1 the machine is shown with the lid, or cover 1 in a closed position. The chassis of the machine is enclosed by a suitable casing 171 out of which protrudes the lower delivery table 10, see Figure 5, the protruding portion of which is covered by policy covering gate 139. The policy, or contract is delivered unexposed between the table 10 and gate 139 until the cover 1 is closed and locked, at which time the gate 139 recedes exposing the lower edge of the policy for issue to the customer. The operating mechanism of this will be described later.

A coin box 72 having a suitable lock therefor, is accessible through an opening in casing 171. A coin rejection slot 174 and a coin insertion slot 173 are on the exterior of casing 171.

Figure 2:
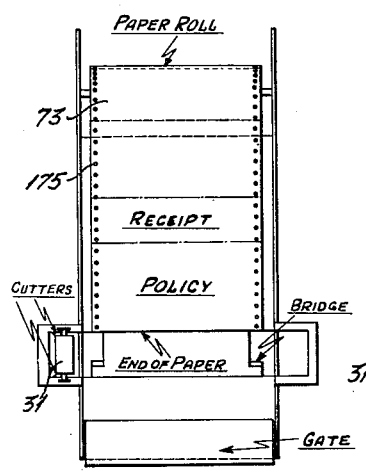
Figures 2, 3 and 4 are diagrammatic views showing the relative positions of the receipt and policy during the operative cycle of the machine.
Figure 3:
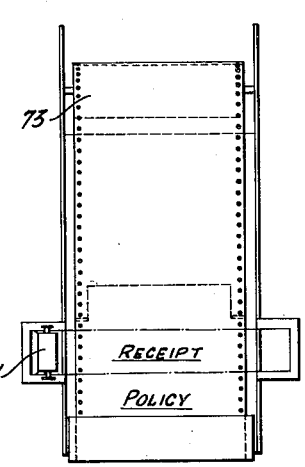
Figure 4:
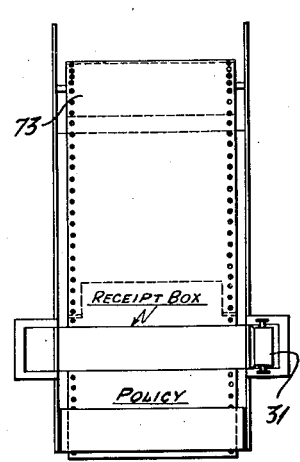

In order to describe the movement of the paper through the machine during its operative cycles Figures 2, 3 and 4 show diagrammatically its progress during the cycle.

In Figure 2 the unitary roll of paper 73 on which the policy and receipt are printed in seriatim is seen. The cutting carriage 31, seen at the extreme left in Figure 2 slides across the chassis in order to sever simultaneously the receipt and policy from the paper roll 73, and is seen in Figure 4 at the extreme right of the chassis after such movement.

On insertion of a correct coin the cover 1 is electrically unlocked by solenoid 164 allowing the customer to raise the cover 1, thereby cocking the paper cutting and delivery mechanism. Provision is made by a ratchet mechanism so that the customer must complete the raising of the cover 1 before it can be closed. Raising of the cover 1 exposes the stylus 46 which the customer then may use to sign a policy replica, which is exposed to him, thereby simultaneously reproducing his signature as written by the machine on both the actual policy and its receipt by a duplicating lever mechanism.

On closing the cover 1 the cover latch engages a tongue attached to the cover and this action releases the governor-controlled spring motor, which had been cocked on opening the cover 1. This release of the spring motor causes the paper roll 73 to advance from its signatory position of Figure 2 to the cutting position of Figure 3 by means of the sprocket teeth 128, see Figure 5, engaging the perforations 175. The completion of this paper movement causes release of the cutter carriage 31 from its position in Figure 3 and its flight across the chassis of the machine severs the paper simultaneously along two cutting lines thereby allowing the receipt to fall into receipt box 176, see Figure 6. The completion of this cutting stroke to the position shown in Figure 4 causes the release of the policy access gate 139, which had also been cocked by the opening of the cover 1. The policy is now accessible to the customer and the cycle is complete. A guiding bridge 129 is provided to allow the paper to advance over the gap 11, see Figure 14, represented by receipt box 176 without curling down into the receipt box. Means are provided to withdraw this bridge after paper delivery, but before the cut-off operation.

The chassis of the machine may be seen in Figures 6 and 10. A base plate 6, stiffened and supported on angles 8, joins the platform on which the vertical chassis plates 4 and 5 are mounted by means of angles 7. An open topped receipt box 176 enters the base plate 6 through a rectangular hole pierced therein, thereby allowing removal of the receipt box and its contents through the bottom of the machine. The rectangular receipt box hole in the base plate 6 is wide enough to permit the paper bridge 129 to pass up through the bottom of the base 6 from its pivot shaft 130 adjacent to receipt box 176.

The upper inclined paper supporting table 9 and the coplanar lower paper supporting table 10 are secured to and supported between the chassis plates 4 and 5. The supporting tables 9 and 10 are separated from one another by space 11, see Figure 14, which represents the gap through which the receipt falls into the receipt box 176 after being severed from the paper roll 73. The upper chassis plate and writing table 12 is hinged about the main drive shaft 3 by means of bosses 2a which are freely floating thereon. This permits the chassis plate 12 to be raised from the operating position shown, for servicing.

Since the entire paper cutting mechanism, hold-down guides, and stylus mechanism are mounted on plate 12, the paper and carbon rolls are left exposed and accessible when the chassis plate 12 is raised. Suitable means, not shown, are provided to latch the plate 12 in its operating position.

It may be seen in Figure 10 that cover 1 is integrally secured to drive shaft 3 by means of blocks 2 so that raising the cover 1 causes shaft 3, which is journalled in the chassis plates 4 and 5, to rotate as the cover is raised. This rotation is made to supply all the energy used by the machine.

In the description of this machine and its operation it will be convenient in the interest of clarity to divide the mechanism into several parts which are relatively independent of one another except insofar as the operation of one initiates the operation of another. These divisions are:

1. Paper cutting mechanism.
2. Paper delivery mechanism.
3. Coin and latching mechanism.
4. Paper bridge mechanism.
5. Gate mechanism.
6. Cover ratchet mechanism.
7. Carbon advancing mechanism.
8. Stylus and writing pad mechanism.
9. Paper clamping mechanism.

1. *Paper cutting mechanism*

This mechanism is described most clearly in reference to Figures 9, 13 and 14. Figures 5 and 10 also assist in the description of the spiral gear drive. The main drive shaft 3 which is journalled in side plates 4 and 5 carries integrally keyed to it, the spiral gear 14. This gear meshes with the driven spiral gear 15, which in turn is keyed to shaft 16 which is journalled in plate 12 and also in bridge 17. The bearing bridge 17 is secured to the plate 12 by means of posts 18. A lever arm 19 carrying cam stud 20 is also keyed to shaft 16 between its journals, so that as the cover 1 is lifted from its closed position to its open position, thereby rotating shaft 3 and gear 14 relative to the chassis of the machine, gear 15 and shaft 16 are equally rotated thereby moving the cam lever 19 from its dotted position in Figure 9 to the full line position shown. This action also causes the stud 20 to force lever 21, which is pivoted to the hinged chassis plate 12 by means of stud 22 by a sliding cam action from its dotted line position shown in Figure 9 to the solid line position as illustrated.

The cutter-carriage driving fork lever 26 is pivoted on stud 27, secured to table 12 so as to be able to move in a plane parallel to plate 12. A link 24 together with pivot-studs 25 and 23 couples fork lever 26 to the lever 21 in such a way that the movement of lever 21 corresponding to that produced by the opening of the cover forces lever 26 from its broken line position in Figure 9 to the full line position shown. This movement also stretches tension spring 28 which is secured to fork lever 26 at one end by stud 29 and at its other end to the chassis plate 12 by means of stud 30. It may be noted that the cam-stud 20 is moving tangentially to lever 21 at the end of the cover opening stroke so that the latching action, which occurs by a mechanism associated with the fork end of lever 26, may take place prior to the completion of the cover opening without imposing an excessive over-play to the stroke of fork lever 26. Also this geometry causes an approximately constant force to be required in opening the cover since the mechanical advantage of this cam system increases as the tension of spring 28 increases. Once fork lever 26 is latched in the solid line position shown in Figure 9 the driving lever 19 may return to the dotted position corresponding to the closed position of the cover, thereby leaving lever 26 and carriage 31 in the cocked position. The carriage block 31 is slidably mounted on the fixed transverse shaft 32 which in turn is supported parallel to the plates 12 by means of support ears 33. The jaws of fork lever 26 embrace a ball bearing 38 which is mounted on the carriage block 31 by means of stud 39. Consequently, as lever 26 moves through its throw in either direction it forces carriage block 31 to slide transversely across the machine in the corresponding direction.

Referring to Figures 13 and 14, it may be seen that two studs 35 tapped into carriage block 31 clamp bearings carrying the rubber-tired wheels 34 and also clamp the cutter wheel plates 36 to the carriage block 31. These wheels 34, which bear on the upper paper table 9 and the lower paper table 10 when in transit, serve to clamp the paper to these tables so as to maintain a line of tension in the paper at right angles to the cutting line. This action is essential to the clean cutting of the paper since a slitting rather than a shearing operation is employed in this mechanism. The wheels 34 also serve to stabilize the carriage 31 and maintain it parallel to the chassis plate 12 as it makes its stroke. Two U shaped extension tracks 44 and 42 are secured to the hinged chassis plate 12 by means of stand-off posts 45 and 43 respectively. These are spaced to be coplanar with the delivery tables 9 and 10 when the hinged chassis plate is in its operating position thereby providing a continuous track for wheels 34 throughout the operating stroke. Thus in Figures 13 and 14 wheels 34 are seen resting on extension track 42 since this represents the cocked position of carriage 31.

The two cutting wheels 40 are freely journalled by studs 41 on the cutter wheel plates 36. They are positioned below the level of the tables 9 and 10 so that they cut the paper along a chord of wheels 40. A catch stud 37, secured to the bottom of the carriage block 31, has beveled surfaces which serves to cam down the latching arm 153 with which it cooperates to latch the carriage in the cocked position during the opening of the cover.

In Figure 5 the latch arm 153 may be seen in the latched position pivoted on stud 154 to the left chassis plate 4 of the machine. The position shown represents the instant before the release of the latch by the completion of the paper delivery stroke. This release is accomplished by the slight additional clockwise movement of arm 111 from its position shown so as to lift the left end of arm 153 thereby depressing the right end of lever 153 and releasing it from engagement with the latch stud 37 on cutter carriage 31. Spring 182 normally biases arm 153 into its latched position and it is the camming action of stud 37 in the cocking operation which extends this spring and then allows arm 153 to drop into the latched position.

Since the fork lever spring 28 exerts considerable force on the latching lever 153 in the cocked position, a roller 178 is mounted on lever 153 so as to roll on plate 4 thereby easing the friction on pivot stud 154. This is because the force couple produced on lever 153 about its pivot 154 by the cocked drive fork 26 would tend both to cock the lever at its pivot bearing and to bend the lever 153 into contact with plate 4, if it were not for the rolling action of roller 178. When, by the action of arm 111, the cutter carriage is released it flies across the machine severing the paper 73 along the two lines representing the boundaries of the receipt and defined by the path of cutter wheels 40. The reaction-force of paper cutting along the chord of freely journalled wheels causes them to rotate thus presenting continually new cutting edges to the paper as the paper is held in tension by the rubber clamping wheels 34.

2. *Paper delivery mechanism*

The paper delivery mechanism is shown most clearly in Figures 5, 6, 10 and 11. Drive arm 77 is integrally secured to shaft 3 so that raising of the cover moves it from the closed position shown in Figure 5 to the open position shown in Figure 6. This motion is transmitted by stud 78 to slotted link 79 and thence, via stud 81 mounted on link 80, to stud 83 mounted on gear segment 82. Gear segment 82 is pivoted on plate 4 by stud 108 and is biased by spring 84 through studs 85 and 86 to the counter-clockwise limit of its throw relative to plate 4. Opening of the cover consequently extends the spring 84 thereby storing potential energy. However, the cover may be closed without the return of gear segment 82 from its cocked position due to the slot in link 80. Guiding stud 81' also secured to link 80 and sliding in the slot of link 79 maintains parallelism between the two links. Gear segment 82 meshes with pinion 109 which is pivoted on stud 110 secured to plate 4. Driving arm 111 and ratchet wheel 113 are secured to pinion 109 and rotate with it on stud 110 as axis. Gear 115 is freely floating on stud 110 as axis and is driven by ratchet wheel 113 through pawl 114 during the clockwise displacement of pinion 111.

The pinion gear train comprising gears 115, 116, 117 and 118, all suitably journalled on the chassis plate 4, is arranged to multiply the angular displacement of driving arm 111 so that during its clockwise or operative motion pinion 118, which integrally mounts butterfly air paddle 119, is driven at a high rate of rotation, thus imposing a damping and governing mechanical load on driving arm 111. On the other hand, during the counter-clockwise or cocking motion of driving arm 111 the multiplying gear train is not set in motion due to the ratcheting action of pawl 114. The action of the opening of the cover is thus made to produce a displacement of somewhat more than 180 degrees in lever 111. For this reason, the link 121 will be driven by stud 112, which secures it to arm 111, in a harmonic acceleration and then deceleration, due to the over center drive, and this will result in its displacement from the position of Figure 5 to that of Figure 6.

Gear 122 pivoted on plate 4 by stud 123 is linked to arm 111 by link 121 through studs 112 and thus is driven in rotary motion by the harmonic displacement of link 121 as described. Gear 122 is meshed with the pinion 124 which is freely journalled on the sprocket shaft 127 as a spindle, the ratio for the geometry shown is one to two between gears 122 and 124. Consequently, the act of opening the cover 1 will cause gear 124, which carries pawl 125, to rotate slightly more than 180 degrees in a counter-clockwise position from that shown in Figure 5 to that shown in Figure 6. The ratchet pawl 125 is biased by spring 126 to bear inwardly against shaft 127. However, since the two diametrically opposite grooves are cut into that portion of shaft 127 lying under the locus of pawl 125 the action of opening the cover 1 will carry the pawl 125 from its position in Figure 5 into re-engagement with the diametrically opposite groove as shown in Figure 6. This counter-clockwise action will not displace shaft 127 due to the ratcheting action of pawl 125.

It may be seen that the energy stored in spring 84 by the opening of the cover 1 may not be released to drive the delivery mechanism until the butterfly governor 119 is free to turn, since the spring force of spring 84 tends to engage gear 109 with the gear train due to the direction of ratchet action provided by pawl 114. However, rod 120 guided by angle support 184 and pivotally secured to lever 143 by stud 149 is positioned to stop rotation of governor 119 by intersecting its peripheral locus for the position of lever 143 shown in Figure 6, whereas rod 120 is moved to free governor 119 for rotation by the displacement of lever 143 from its position of Figure 6 to that shown in Figure 5. This release of governor 119 occurs on the closure of lid 1 by the action of the latching mechanism described below. Consequently, on closure of lid 1, pawl 125, delivering energy from spring 84 under the approximately constant rate imposed by governor 119, rotates shaft 127 and with it the integral sprocket wheels 128, see Figure 10, thus moving the mechanism from the position of Figure 5 to the sprocket position shown in Figure 6. Since the paper roll 73 is engaged to sprockets 128 through the sprocket holes 175 this action will displace the paper along tables 9 and 10 over the gap 11 via bridge 129 for a predetermined distance determined by one half the pitch periphery of the sprockets.

It is to be noted that this movement will be an harmonic one in which the acceleration and deceleration are approximately evenly distributed. This minimizes the inertial stress placed on the sprocket holes in the paper and permits the use of a cheaper grade of paper. In order to overcome the tendency of the sprockets to coast after pawl 125 has come to rest it is possible to incorporate a friction brake (not shown) bearing on the sprockets themselves. The paper roll 73, see Figure 5, is supported on a pivot 74 resting on the guide brackets 76 on each side thereof, and held down by spring 75 for easy removal or insertion from the rear of the machine. In Figures 5 and 10 the slotted guide plates 69, which are secured to chassis plate 12 by posts 70, may be seen to hold the paper in proper engagement with the sprocket teeth. Adequate clearance between table 9 and plate 69 is provided to prevent friction on the paper delivery.

3. Coin and latching mechanism

The conventional coin accepting mechanism 71 secured to plate 4 is arranged to deliver valid coins to the coin box 72 through a slot therein, see Figure 8. Spurious coins are made to fall from a side aperture in 71 into the coin return chute 174, see Figure 1. A conventional normally opened switch 184 is provided as an integral part of mechanism 71 and so constructed as to make momentary contact when a valid coin is passed into the coin box 72.

Referring to the circuit diagram of Figure 15, the momentary contacting of switch 184 will energize the lock-in relay 167 which is positioned at any convenient place on the chassis of the machine. Since the latch solenoid 164 is electrically in parallel with the coil of relay 167 it will also be energized as long as relay 167 is locked in. This condition will persist until the normally closed unlocking switch 168 is opened by the opening of the cover 1, at which time the system will be restored to its initial unenergized condition. Unlocking switch 168 may be seen in Figures 5 and 6 to be mounted on plate 4 in such a position that an extension of stud 81 is arranged to lift its leaf in the closed position of cover 1 thereby closing its circuit. Opening of the cover 1 allows the spring leaf of switch 168 to actuate it into the electrically open position.

Referring to Figure 7, the latch solenoid 164 is arranged to be capable of moving its armature 165 leftward into the energized position shown. This armature is coupled to the lever 144 by link 162 and studs 163. However, lever 144 is integrally secured to shaft 145 as is the lever 143 on the opposite side, see corresponding Figure 6. Consequently, as levers 144 and 143 are integrally moved from the position of Figure 5 to that of Figures 6 and 7 by the energization of the solenoid and against the biasing spring 183, they carry with them the cross-latch bar 146, which joins their ends through clearance slots in the side plates 4 and 5.

Figure 11:
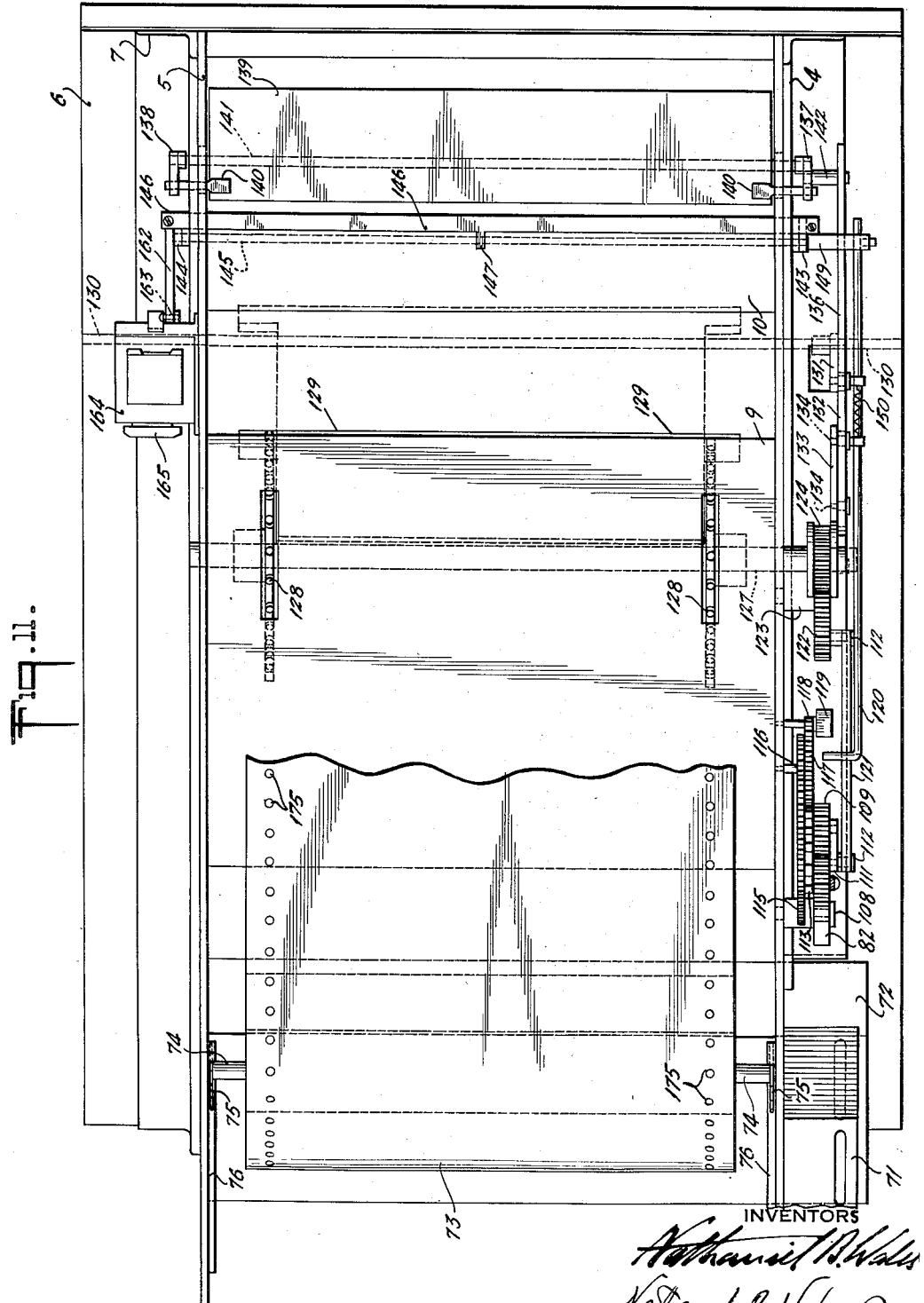
Figure 11 is a plan view of Figure 5 with parts removed and taken in the direction of arrow 8 in Figure 7.

Referring to Figures 5, 11 and 12 it may be seen that this energization of solenoid 164 causes the latch tongue 147, which is secured to the midpoint of bar 146, to withdraw from hole 179 in the cover tongue 181, thereby releasing the cover for manual opening. Simultaneously the withdrawal of tongue 147 from hole 179 allows the slotted spring stop leaf 148 to move upward from its prior position underneath bar 146 until a suitable stop brings its slotted fingers into line with bar 146 on either side of tongue 147. Thus, even after the switch 168 has deenergized solenoid 164 the bar 146 is held in its advanced position against the tension of spring 183 by the fingers of leaf 148 until, on closing the cover, tongue 181, descending through slot 180 in the plate 12, depresses leaf 148 allowing bar 146 to move under the tension of spring 183 so as to reengage tongue 147 into hole 179 of the cover 1 and also allowing the slotted fingers of leaf 148 to pass underneath.

Summarizing, the insertion of a valid coin unlocks the cover for opening and locks the latch bar 146 in the open position, whereas closing of the cover releases bar 146 and its levers 144 and 143 to the position shown in Figure 5. As before mentioned, the latter action initiates the paper delivery mechanism operation by rod 120.

4. Paper bridge mechanism

The bridge 129 comprises an L-shaped plate seen in Figures 5, 6 and 11, pivoted and integrally secured to shaft 130 which is journalled in the base-angles 8. The bridge is actuated by lever 131 secured to shaft 130. This lever emerges through a slot in base plate 6 on the outside of side-plate 4. Lever 131 is linked to the oscillatory motion of gear 122 through the slotted link 132 and the solid link 133 by means of stud 135. Stud 134 maintains parallelism between links 133 and 132. The relatively light spring 169 tends to maintain the bridge in the extended position of Figure 6, thereby forming a platform over which the front edge of paper advancing from table 9 to table 10 may pass without curling down into the receipt box 176 due to the set of the paper resulting from its ageing in a rolled position. Spring 150 on the other hand, is stronger than spring 169 and tends to maintain the telescopic linkage between gear 122 and lever 131 at its minimum length. Consequently, as the cover is opened, thereby moving gear 122 clockwise to the position of Figure 6 the geometry of the linkage is such as to allow spring 169 to extend the bridge over the gap 11.

When the cover is closed gear 122 remains stationary until, on latching, the paper delivery train is released and the paper begins to advance over the extended bridge while gear 122 moves counter-clockwise. Since the stud 135 is moving nearly normal to the linkage 133, 132 during the first half of the paper delivery, there is very little movement of the bridge in this phase from its extended position, and during this interval the front edge of the paper has already completed its transit of the gap 11. During the latter portion of the counter-clockwise motion of gear 122 the bridge is retracted, having served its purpose and in the last portion of the throw of 122 the telescopic linkage is called on to permit the desired extension of the linkage thereby permitting the bridge to be fully retracted before gear 122 has completed its throw, thereby releasing the cutter carriage. Evidently, the bridge must be so retracted to avoid interference with the cut-off operation.

5. Gate mechanism

The gate 139, seen in Figures 5, 6, 7 and 11, comprises a plate carrying ears 140 which extends through slots in the chassis plates 4 and 5. These ears are engaged in elongated holes in the drive levers 137 and 138 which are integrally secured to shaft 141 which is journalled in side plates 4 and 5. Thus, rotation of shaft 141 causes extension, or retraction, of the gate 139 thereby covering, or exposing, the end of the paper which passes between the gate 139 and the table 10.

Spring 160, Figure 7, normally tends to retract the gate, but the slotted link 136, connecting stud 135 on gear 122 and stud 142 on lever 137 forces the gate into extension against spring 160 when the cover 1 is opened. A bent latch bar 157, see Figure 7, is pivoted about a journal in block 158 so that the left hand end of bar 157 may move normally to plate 5 into latching interference with lever 138 under the bias of leaf spring 159 when the gate is extended. Thus, even after the paper delivery starts, thereby relieving the compression along link 136, the gate cannot retract under the force of spring 160 until the latch bar 157 is moved inward towards plate 5 thereby allowing lever 138 to pass by it and retract the gate. This action occurs when the cutter carriage 31 hits the right-hand end of bar 157 on the completion of the cut-off operation thereby rotating it in journal block 158 and releasing lever 138.

6. Cover ratchet mechanism

In order to assure full throw in opening the cover 1 a ratchet 97, see Figure 7, is secured to cover shaft 3. Floating on shaft 3 is a lever 101 which is acted on at the latter portion of the opening throw of ratchet 97 by pin 170 inserted therein and at the latter portion of the closing throw of ratchet 97 by the pin 170a also mounted on ratchet 97. This lever 101 is connected at its outer end by a spring 100, through studs 103 and 104, to a ratchet pawl 98 which is journalled to the side of the chassis 5 by stud 99. To illustrate the action of the ratchet the mechanism is shown in a solid line position representing the system just before the cover has been fully opened and in a broken line position representing the fully opened position. In the solid line position which has obtained throughout the act of opening the cover, the lever 101 positions the end of spring 100 so as to produce a clockwise torque on pawl 98. This engages pawl 98 with ratchet 97 and allows the cover only to be opened further by ratchet action. When the cover reaches the solid line position, pin 170 contacts lever 101, which heretofore has been biased counter-clockwise due to the geometry and forces it clockwise until the spring 100 passes over the line of centers between shaft 3 and pivot 99. After this point the spring 100 then produces a clockwise torque on lever 101 while setting up a counter-clockwise torque on pawl 98. This results in these respective parts snapping over into the broken line position shown and thereby causing the disengagement of pawl 98 to allow the cover 1 to be closed without further hindrance.

By a similar but reverse action pin 170a resets the pawl 98 into engagement during the last few degrees of closing action, thus re-establishing the system for the next opening operation. A spring 105 is provided to prevent slamming and to distribute the cover load between opening and closing. This spring is secured at the bottom to the base 6 and at the top to cable 106 which runs over the hub of ratchet 97 where is it secured by stud 107.

7. Carbon advance mechanism

The carbon 94 is stretched over the paper and under plate 69 between a supply roller 95, journalled on blocks 96 secured to plate 5 and a take-up drive roller 93 journalled to plate 4 by blocks 92, see Figure 10. In Figure 5 it may be seen that a shaft-extension 91 of roller 93 supports a ratchet spring 90 secured to drive lever 89. A link wire 88 connects the end of drive lever 89 to the stud 87 mounted on delivery drive link 80. Consequently the reciprocation of link 80 due to the opening and closing of the cover 1 causes a corresponding oscillatory angulation of lever 89 about shaft 91 as axis. The sense of winding of ratchet spring 90 about shaft 91 is such that it grips when lever 89 is descending and ratchets when lever 89 is rising, thereby causing a progressive advance of the carbon paper between the supply roller 95 and the take-up roller 93.

8. *Stylus and writing pad mechanism*

The erasable writing pad mechanism 65, see Figures 8 and 10 is of the type comprising a transparent plastic sheet resting on a sheet of translucent tracing paper which in turn rests on a waxed surface. When the pressure of a stylus is brought on the plastic it causes the tracing paper to adhere to the waxed surface thereby changing the optical properties of the tracing paper and causing a visible mark to appear from the reflected light. Conversely, when the tracing paper is lifted away from contact with the waxed surface the bond disappears and on relaying the sheets together the previous visible marks are erased and the pad is ready for a new marking. The waxed surface in this case is the surface of plate 12 itself, while the transparent plastic and tracing paper are held together in a frame designated as 65. This frame is hinged at its lower edge to plate 12 and when lifted by the spring wire member 66, which protrudes through a hole in plate 12 under frame 65 at one end and is secured to the underside of plate 12 at its other end, the previous marking is thereby erased. This action is consequent to the traverse of lever 26 through its cocking or cutting arc due to the cam action betwesen it and the depending knee 66a bent into the spring wire lever 66. See Figures 9 and 10.

The writing stylus 46, see Figures 7, 8 and 9 is flexibly and rotatably secured to lever 50 by the spring leaf member 49 clamped between the stem 47 and point bushing 48 so that the stylus may be freely manipulated although maintaining close correspondence between the motion of the end of lever 50 and the motion of the tip of the stylus. Lever 50 is given three degrees of freedom by means of link 51 which is journalled to it by stud 52 and by the pivotal mount of sleeve 53 which journals stud 54 secured to lever 51. This pivotal mount comprises journal pins 56 affixed to ring 55 which is secured to plate 12, thus allowing sleeve 53 to pivot about an axis parallel to the upper edge of plate 12. This allows the stylus to be freely lifted off of the writing pad. A strap spring 58 bearing between pins 60 and the sleeve 53 tends to lift the whole stylus thus counterbalancing it and requiring a high manual pressure to mark the pad. Integrally secured to lever 50 is the duplicating lever 61 which is bent down after its point of attachment to lever 50 through an aperture in plate 12 and then is bent parallel to the upper paper delivery table 9, see Figure 7.

A reproducing stylus 63 secured to the underside of the lower end of lever 61 registers with the top portion of carbon paper 94 which in turn registers with the receipt form thereunder. A spring extension member 62 secured to the end of lever 61 serves as a flexible support for the second reproducing stylus 64 which by means of the carbon paper 94 reproduces the movement of stylus 46 on the policy. In this manner two reproductions are coincidently made when the point 48 of stylus 46 is pressed onto the writing pad 65. The spring member 62 permits transfer of the downward marking component derived from stylus 46 individually to stylus 64 to assure its perfect reproduction.

9. *Paper clamp mechanism*

In order to definitely clamp paper 73, see Figure 13, before the rubber tired cutter carriage wheels 34 contact and place it under cross tension for the cutter wheels 40 to shear, the cutter wheel studs 35, see Figure 14 are extended so that they contact the cam portion of paper holding fingers 67 and 68 when cutter carriage 31 is in its extreme left-hand position as is seen in Figure 13, so that the fingers 67 and 68 are elevated to permit an advance of paper 73 along tables 9 and 10 at this point in the machine's cycle. However, when cutter carriage 31 is released and starts to move across the paper cutting same as defined by carriage guide bar 32, fingers 67 and 68 are released by this movement from studs 35 and due to their downward spring bias contact paper 73 at their inner ends as is seen in Figure 13 at 68a, hence the paper 73 is simultaneously gripped by both fingers.

This vending machine under actual tests has effectively operated without failure, even when a high degree of humidity prevailed due to the above described safeguards incorporated to maintain the paper 73 in its defined path through the machine and while it undergoes the above described slitting action.

What we desire to protect by United States Letters Patent is encompassed in the following claims:

1. In a machine for vending contractual forms, the combination comprising a paper roll on which is printed in alternate sequence a receipt and a contractual document related to said receipt, means for writing simultaneously on said document and said receipt, a cover for said simultaneous writing means, a paper-cutting device adapted to sever one said document and one said receipt from said paper roll, a receptacle within the machine for said severed receipts, a coin box, a coin aperture, a duct communicating between said aperture and said coin box, a lock for said writing means cover, means actuated by the passage of a coin through said duct for releasing said lock, means for advancing the paper from said roll a predetermined distance equal to the total length of said document and receipt, said means being actuated by the closure of said writing means cover, and means actuated by the closure of said writing means cover to actuate said paper-cutting device.

2. In a machine according to claim 1, the combination including a delivery platform, a cover for at least a portion of said platform, means actuated by the opening of said writing means cover to close said delivery platform cover, and means actuated by the operation of said cutting means to open said delivery platform cover.

3. In a machine according to claim 1, the combination including a spring, means for storing energy in said spring from the work necessary to open said writing means cover, and means for converting a part of this energy into the work required for the operation of said paper-advancing means.

4. In a machine according to claim 1, the combination including a spring, means for storing energy in said spring from the work necessary to open said writing means cover, and means for converting a part of this energy into the work required for the operation of said paper-cutting means.

5. In a machine according to claim 3, the combination including a speed-limiting governor, and means for coupling said governor to said paper-advancing means during the advancement of said paper.

6. In a device according to claim 1, the combination comprising a paper-delivery platform, a writing platform, said cutting means being positioned between said writing platform and said delivery platform, a bridge member, and means for extending said bridge member into the gap between said writing and delivery platform whereby to guide and support the paper across said gap during the advancement of said paper.

7. In a device according to claim 1, the combination including a ratchet permitting opening of said writing means cover but restraining the closing of said cover, means for disengaging said ratchet after the opening of said cover to a predetermined amount, and means for engaging said ratchet on the closure of said cover.

8. In a machine for vending contractual forms, the combination comprising a paper roll on which is printed in alternate sequence a receipt and a contractual document related to said receipt, means for writing simultaneously on said document and said receipt, a stylus for said writing means, a cover for said stylus, a paper-cutting device adapted to sever one said document and one said receipt from said paper roll, a receptacle within the machine for said severed receipt, a coin box, a coin aperture, a duct communicating between said aperture and said coin box, a lock for said stylus cover, means actuated by the passage of a coin through said duct for releasing said lock, means for advancing the paper from said paper roll, a predetermined distance equal to the total length of said document and receipt, said means being actuated by the closure of said stylus cover, and means actuated by the closure of said stylus cover to actuate said paper-cutting device.

9. In a machine according to claim 8, the combination including a delivery platform, a cover for said platform, means actuated by the opening of said stylus cover to close said delivery platform cover, and means actuated by the operation of said cutting means to open said delivery platform cover.

10. In a machine according to claim 8, the combination including a spring, means for storing energy in said spring from the work necessary to open said stylus cover, and means for converting a part of this energy into the work required for the operation of said paper-advancing means.

11. In a machine according to claim 8, the combination including a spring, means for storing energy in said spring from the work necessary to open said stylus cover, and means for converting a part of this energy into the work required for the operation of said paper-cutting means.

12. In a machine according to claim 10, the combination including a speed-limiting governor, and means for coupling said governor to said paper-advancing means during the advancement of said paper.

NATHANIEL B. WALES.
NATHANIEL B. WALES, Jr.

REFERENCES CITED

The following references are of record in the file of this patent:

UNITED STATES PATENTS

| Number | Name | Date |
| --- | --- | --- |
| 421,926 | Grethen | Feb. 25, 1890 |
| 615,022 | Hoff | Nov. 29, 1898 |
| 1,230,872 | Crompton | June 26, 1917 |
| 1,385,933 | Templeton | July 26, 1921 |
| 2,266,825 | Streckfuss | Dec. 23, 1941 |
| 2,271,073 | Harris | Jan. 27, 1942 |